United States Patent [19]

Hunt

[11] Patent Number: 5,140,824

[45] Date of Patent: Aug. 25, 1992

[54] GAS HYDRATE THERMAL ENERGY STORAGE SYSTEM

[76] Inventor: Steven C. Hunt, 729 Brethour Ct., Sterling, Va. 22170

[21] Appl. No.: 706,415

[22] Filed: May 28, 1991

[51] Int. Cl.⁵ .................................................. F25D 3/00
[52] U.S. Cl. ........................................ 62/59; 62/435; 165/104.13; 252/68; 252/70
[58] Field of Search ............... 62/59, 434, 435; 165/104.13; 252/68, 70

[56] References Cited

U.S. PATENT DOCUMENTS

| | | | |
|---|---|---|---|
| 3,353,366 | 11/1967 | Orfeo et al. | 62/112 |
| 3,941,311 | 3/1976 | McNeely | 165/104.13 X |
| 3,974,824 | 8/1976 | Smith | 126/438 |
| 4,286,579 | 9/1981 | Johnston | 126/438 |
| 4,540,501 | 9/1985 | Ternes et al. | 252/70 |
| 4,696,338 | 9/1987 | Jensen et al. | 165/1 |
| 4,812,250 | 3/1989 | Ambrosino et al. | 62/67 |
| 4,821,794 | 4/1989 | Tsai et al. | 62/59 X |
| 4,831,830 | 5/1989 | Swenson | 62/59 |
| 5,056,320 | 10/1991 | Winkler | 62/59 |
| 5,065,598 | 11/1991 | Kurisu et al. | 62/59 X |

Primary Examiner—William E. Tapolcai
Attorney, Agent, or Firm—Venable, Baetjer, Howard & Civiletti

[57] ABSTRACT

Gas hydrate thermal energy storage system and process useful for heating, air conditioning and process cooling, in which a liquid phase and a vapor phase of a 3-component mixture of a refrigerant, heat transfer oil and water, are maintained in an enclosed vessel, emulsified by a mixer and cooled (charged) by one of two internal heat exchangers, stored in its cooled state in the vessel, and later discharged via the other internal heat exchanger.

12 Claims, 2 Drawing Sheets

GAS HYDRATE THERMAL ENERGY STORAGE SYSTEM

BACKGROUND OF THE INVENTION

The present invention relates to a thermal energy storage system and particularly to a latent and sensible heat storage and transfer system useful for heating, air conditioning and process cooling.

Rising electrical utility production costs and increased demands for power during peak periods have led to increasing costs to utility companies and consumers. Electrical load management has become important, especially during peak demand periods, such as the air conditioning months of summer. Utility companies, in an effort to reduce costs, have begun offering incentives including reduced rates and subsidies for off-peak usage.

Thermal energy storage systems have been proposed as a means to shift power consumption from peak demand periods to off peak periods. For example, it has been proposed to incorporate a cool storage medium in a heat pump or air conditioning system, with the medium being cooled during off peak hours and then used to cool an enclosed space (e.g., a room) during peak hours. Typical state of the art thermal energy storage systems include solar systems and phase change material or latent and sensible heat storage systems. The latter systems, such as ice storage systems, store heat, or in effect, cold, as sensible heat and as the latent heat of a phase change. Conventional chilled water systems are thermal storage systems that store sensible heat. Unfortunately, all of these systems require large volumes per unit of heat exchange, and generally are not very efficient because of low volumetric heat capacities. Ice storage systems additionally require a cooling unit to operate below the freezing temperature of water since they use the heat capacity of the ice/water transition.

The use of phase change materials offers advantages over sensible heat storage systems. Phase change materials such as ice, hydrated salts, and gas hydrates require smaller volumes to store and to release a given amount of thermal energy because their high latent heats.

Standard heating, ventilating, and air conditioning (HVAC) practice requires air conditioning delivery temperatures or 5° C. to 13° C. Ice storage systems are currently being incorporated in some newly constructed buildings, but remain somewhat deficient in performance. Although ice storage systems have high latent heat capacities, ice that is formed on the evaporator surfaces acts as an insulator. This reduces the heat transfer coefficients and thermodynamic efficiencies.

Extensive research has been conducted into hydrated salt systems. The only energy that can be retrieved reliably is that energy released by crystallization of the aqueous phase in a salt solution. For this type of system to be feasible, large storage tanks are required to increase the heat transfer surface area and improve the heat transfer rate. Such large storage tanks would however, increase the amount of ambient heating, which is inefficient, and therefore would decrease overall performance.

Some research has also been done with gas hydrate systems, but their potential has not yet been developed. Gas hydrate thermal energy storage systems utilize the properties of water to improve heat transfer coefficients and thermodynamic efficiencies.

Moreover, there is concern about the use of many refrigerant gases, particularly those Freon® and related gases that are considered to be ozone layer hostile. This search has lead to newer, less harmful refrigerants to replace Refrigerants 12 ($CCl_2F_2$) and 22 ($CHClF_2$). Thus, the use of some of these newer, less harmful refrigerants in gas hydrate thermal energy storage systems promises a sensible solution to the energy conservation and environmental problems that currently confront the world.

Gas Hydrates

Thermal energy storage systems using clathrates have shown great promise in facilitating the efficient use of heating and cooling energy. Thermal storage systems including latent heat storage systems based on clathrate hydrates have proven effective for storing thermal energy through the formation and decomposition of clathrate material. A clathrate is a compound formed by the inclusion of molecules of one kind in the cavities of the crystal lattice of another. Gas hydrates form a class of clathrates in which a hydrogen-bonded water molecule lattice encloses a guest molecule of gas. The trapped gas lends stability to the structure, which permits most such hydrates, which are principally water, to exist as a solid at temperatures well above the freezing point of water. Although gas hydrates are classified as clathrates, they retain many of the important characteristics of liquids, notably their thermodynamic properties. Thus, gas hydrates have an advantage as compared to pure water when used as a storage medium, in that the transition temperature is well above 0° C., and the transition temperature can lie within the operating temperatures of conventional air conditioning systems (5° C. to 13° C.).

Gas hydrates form when a lattice-like shell encloses the guest gas molecule. The enclosed gas molecule stabilizes the lattice structure and is held there by weak van der Waals forces. Hydrogen bond interaction between adjacent water molecules permits the formation of the lattice structure that encloses the gas, and allows interaction with other host-lattice molecules.

Gas hydrates themselves are classified into two groups. In the first group are Structure I gas hydrates, with guest molecules having diameters less than 5.5 Å units. In the second group are Structure II hydrates having guest molecules diameters between 5.6 Å units and 6.6 Å units. The chemical composition of the gas hydrate is dependent upon the molecular size of the guest molecule. For those Structure I molecules whose diameters are less than 5.2 Å units, the chemical composition is most commonly $N.5.75\ H_2O$. Structure I hydrates whose diameters are between 5.2 Å units and 5.5 Å units have a chemical composition generally of $N.7.67\ H_2O$. Finally, Structure II gas hydrates will form compositions of $N.17.0\ H_2O$.

Gas hydrates have a high heat of formation which make them ideal as cool storage media. The energy storage density of gas hydrates is extremely high, assuming efficient conversion of the storage medium to gas hydrate. Therefore, it is possible for an efficient cooling system using gas hydrate storage materials and a relatively small chiller operating in a charging mode for several hours to provide a cooling capacity equivalent to that of much larger conventional air conditioning equipment. This size savings is a significant advantage.

To be useful for a gas hydrate thermal energy storage system, the gas hydrate preferably should be capable of being formed at atmospheric pressure and within the temperature limits that are acceptable under conventional HVAC practice, that is, preferably within the temperature range from 5° C. to 13° C.

One approach for using gas hydrates as a thermal energy storage medium is described in U.S. Pat. No. 4,504,501 to Ternes et al. Ternes et al. disclose a process for forming a gas hydrate from an emulsion of water, a refrigerant, and a non-participating surfactant in a direct charge/discharge cool storage system. The process discloses the use of direct contact heat exchange in both the charging stage where the emulsion is cooled to form gas hydrate and in the decomposition stage where the cool thermal energy is transferred to ambient air. The disadvantages with such a system are that: (1) the electrical energy requirement is increased since the refrigeration cycle must be continuously operated during charging, (2) the continuous refrigeration cycle removes thermal energy so quickly that ice forms instead of gas hydrate, and (3) the discharge cycle promotes clogging and increased pressure drop since the gas hydrate slurry, which is a semi-solid viscous gel, must be pumped through an external heat exchanger in which the slurry gives off cool energy as it changes back to water and gaseous refrigerant.

There are other systems which use heat exchangers inside the storage tank of their systems. These systems tend to create large crystalline masses within the tank during charging. In this case, when a cooling effect is desired, warm fluid is sent through a heating/cooling coil (or other heat exchanger), which melts the crystalline mass surrounding the coil and thereby cools the fluid. As the frozen storage material around the coil melts, a boundary layer of water forms between the coil and the remaining crystalline mass. After some time, cooling occurs primarily through natural convection (rather than by forced convection and conduction), which in a large system is a time consuming and inefficient method of transferring heat.

Thus, while systems employing the formation and decomposition of clathrate material have been used, complete reaction of water and the gas during the charge cycle has proven difficult. Further, the formation of large crystalline masses within the storage tank of previous systems has inhibited effective and rapid heat transfer into and out of the storage system.

SUMMARY OF THE INVENTION

This invention relates to an improved, practical, gas hydrate thermal energy storage system. It is particularly useful in connection with air conditioning, as a means for cooling.

The invention relates to both the equipment used and the process that is practiced. In the process, a liquid phase and a vapor phase are maintained in an enclosed, preferably insulated, vessel. The liquid phase comprises three components: water, refrigerant, and a heat transfer medium, preferably a heat transfer oil. Generally, the heat transfer oil is totally miscible with the refrigerant, and is not miscible with water. The refrigerant must be one that forms a gas hydrate at temperatures that are within or close to the cooling range approved for HVAC practice, namely, from about 5° C. to about 13° C. The refrigerant may be a single refrigerant material or a mixture of such materials.

To avoid complications that have arisen in past such systems, two circulating systems are provided, one of which is designed to supply cooling refrigerant to an indirect heat exchanger that is disposed within the vessel, and the second of which is designed to circulate a coolant liquid, through another indirect heat exchanger disposed within the vessel. In the vessel, the coolant is chilled, then passed through an air conditioning or air cooling unit to effect the desired cooling of the environment.

The vessel is provided with means for agitating the liquid phase within the vessel and for forming the liquid contents of the vessel into an unstable emulsion from which, as the emulsion is brought within the chilled temperature range desired, gas hydrate crystals are formed. Since the contents of the vessel are exposed to both heat exchangers, one of which injects thermal energy into the contents of the vessel, and the other of which extracts thermal energy from the contents of the vessel, in operation of the process of the invention an equilibrium is maintained within the vessel, with a liquid phase occupying the lower portion of the vessel, and with a gas phase occupying the upper region of the vessel. The liquid phase actually is a slush or slurry of gas hydrate solids dispersed in a liquid medium.

The systems of this invention have particular utility for air conditioning and refrigeration applications aboard commercial, merchant and fishing vessels. At the present time, ammonia, R-717, is the most frequently used refrigerant aboard these types of vessels. However, it has been classified as an environmental toxin. It is very flammable, and potentially highly explosive when mixed with air in certain proportions. Also, it is a very reactive chemical, and it attacks many metals and alloys. Mild steel, which may be used to contain ammonia and ammonia vapors on land, is unsuitable for use in marine environments.

The refrigerant R-142b ($CH_3CClF_2$) is one of several new refrigerant materials being considered to replace ammonia. R-142b gas hydrate, or some other similar gas hydrate, may obviate or alleviate the problems attendant to the use of ammonia. The refrigerant R-142b is less toxic than ammonia and is not quite as flammable. R-142b is not flammable when blended with refrigerant R-22 ($CHClF_2$) in a 55/45 weight percent mixture, and thus forms an acceptable gas hydrate. Refrigerant 134a (($CHF_2)_2$) is also a replacement refrigerant candidate for ammonia and forms gas hydrates.

The invention can be better understood by reference to the drawings and the following detailed description of the drawings.

DETAILED DESCRIPTION OF THE DRAWINGS

Figure 1:
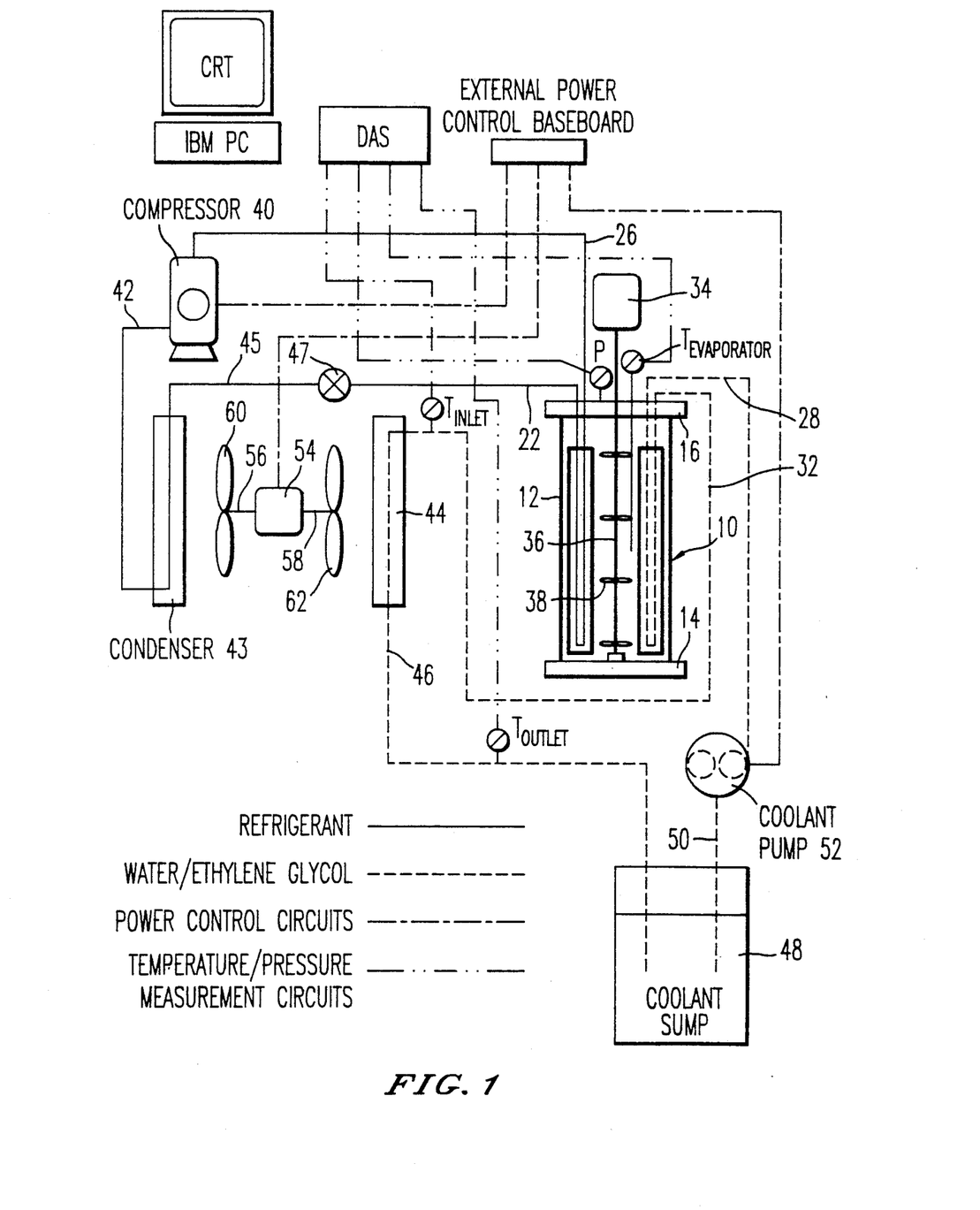
FIG. 1 is a schematic diagram showing the general configuration of equipment that can be used to practice one embodiment of the invention, the several items of equipment being indicated to illustrate the functions involved and not necessarily being disposed in a realistic manner.
Figure 2:
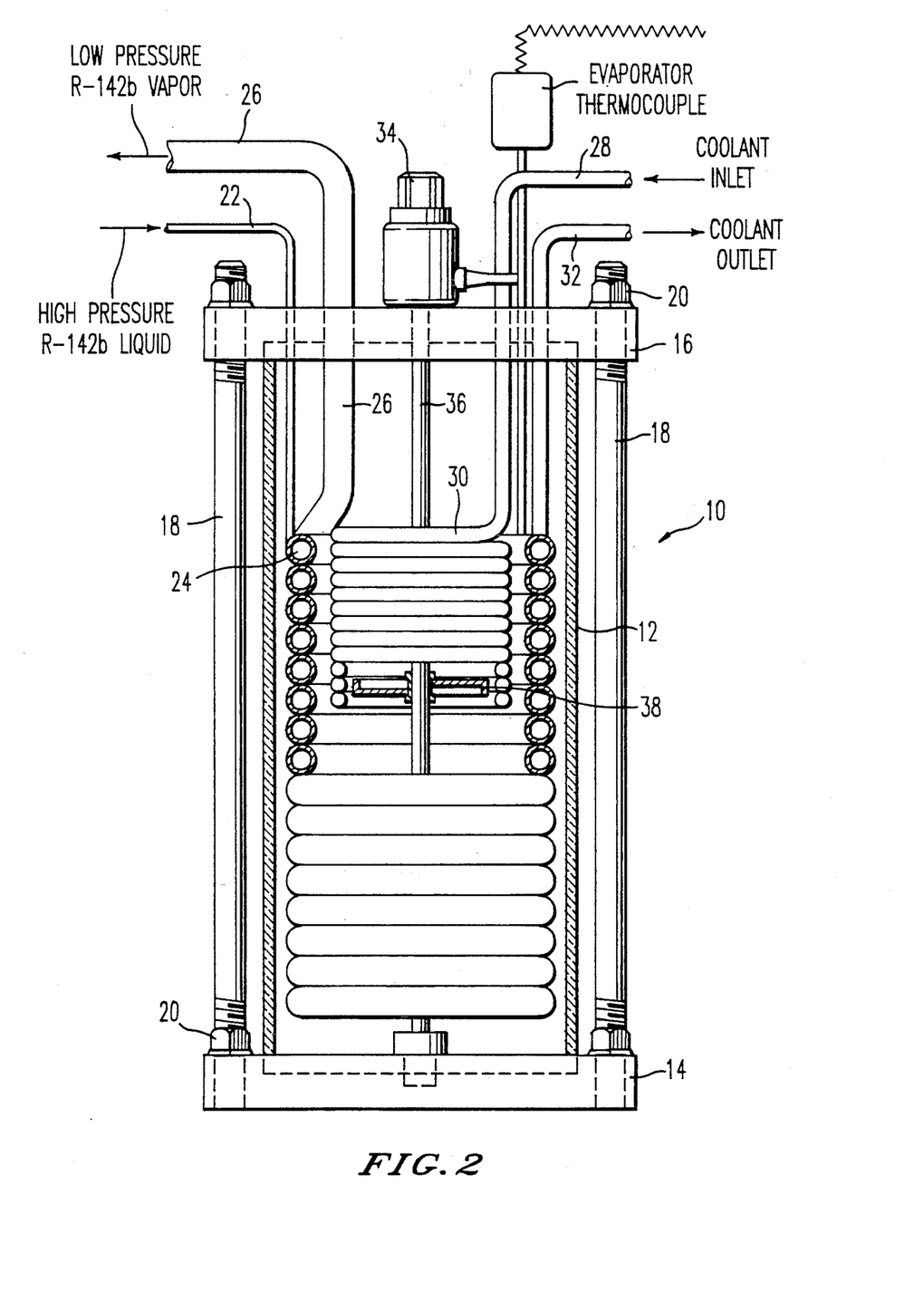
FIG. 2 is a schematic side elevation of one form of vessel that can be used in the practice of one embodiment of the process of the invention, showing the internal indirect heat exchangers, a turbine for agitation and emulsion forming, and the connection and discharge lines used in operation of the equipment.

Referring now to the drawings in detail by numerals of reference, the numeral 10 denotes generally a reactor vessel. This reactor vessel 10 is formed from a thickwalled cylinder that is disposed on a machined aluminum base 14 and capped with a stainless steel head assembly 16. Compressible plastic gaskets (not shown), preferably made of a Teflon ® elastomer, are interposed between the ends of the glass cylinder 12 and the confronting surfaces of the base 14 and the head assembly 16, respectively. The base 14 and head assembly 16 are held together by a plurality of threaded connector rods 18, that are fastened by nuts 20 in such fashion that the chamber within the vessel is liquid-tight and can withstand pressures up to 100 psia.

A refrigerant line 22, adapted to carry refrigerant under low pressure, is connected through the head assembly 16 to supply low pressure refrigerant vapor to the coil 24 of an indirect heat exchanger that is disposed within the vessel, i.e. within the bore of the glass cylinder 12. A low pressure, refrigerant vapor discharge line 26 leads from the opposite end of the coil 24 through the head, for a purpose to be described presently.

Similarly, a coolant inlet line 28 is connected through the head 16 to the coil 30 of a second indirect heat exchanger that is disposed within the bore of the glass cylinder 12. A coolant outlet line 32 is connected to the other end of the coil 30 to permit chilled coolant to be drawn off from the coil 30 of the second indirect heat exchanger that is disposed within the bore of the glass cylinder 12.

A motor 34 is mounted on or above the head assembly 16, with its shaft 36 projecting through the head into the interior of the vessel 10. One or more turbine mixing blades 38 is, or are, mounted along the shaft 36 in position to agitate and emulsify the liquid phase that is placed within the vessel 10 during practice of the process of the invention.

The low pressure refrigerant line 26 is a part of a closed loop circuit that includes the heat exchanger coil 24, whose purpose is to permit cooling of the contents of the vessel 10. The circuit includes conventional refrigeration equipment. Thus, the low pressure refrigerant line 26 is connected to a compressor 40. The compressor 40 discharges the compressed refrigerant through a line 42 through a condenser 43. Thermal energy is removed from the liquefied refrigerant in the condenser 43 by a means to be described presently. The cooled liquid refrigerant then passes through the high pressure refrigerant line 45, through the expansion valve 47, where it flashes into vapor, to the low pressure inlet line 22, to enter the coil 24, in which thermal energy is transferred into the cool, low pressure refrigerant gas for transfer of the thermal energy out of the vessel 10.

The coolant outlet line 32 is also part of a heat exchange circuit, designed to remove cold coolant from the vessel 10 and deliver it to a heat exchange array 44 from an air conditioning unit. While the heat exchange array 44 will cool air that is blown through it, thus delivering the "product" output of the equipment, the chilled coolant passing through the heat exchange array 44 picks up thermal energy. The warmed coolant is transferred through a line 46 through a coolant sump 48. The contents of this sump are maintained, preferably, at a constant temperature, using heat exchange means if necessary, generally in combination with a circumferential insulating blanket. The contents of the sump are withdrawn from the sump 48 through a line 50 by a pump 52, for transfer through the coolant inlet line 28 back into the heat exchanger coil 30 in the vessel 10.

While a single motor 54 is shown in FIG. 1 as being provided with a pair of shafts 56 and 58, respectively, that are in axial alignment with each other, separate motors can be used if desired. Fan blades 60, 62 are mounted at the ends of the shafts 56 and 58, respectively, to cause air to travel over the condenser 43 and through the heat exchange unit 44.

For simplicity and ease of illustration, the cylindrical part 12 of the vessel 10 has been described as a glass cylinder. It may be made, however, and preferably is made, of any material that is a poor thermal conductor, that is, a good thermal insulator. Also, additional conventional insulation preferably is wrapped around the vessel 10, to limit ambient heating.

To practice the process of the invention, the liquid components or ingredients are inserted into the vessel 10 through an injection opening (not shown) in the head assembly 16.

The order in which the three liquid components are injected is important. Preferably pure distilled water is used, and is injected first. The heat transfer oil is then injected. The preferred heat transfer oil is sold under the mark Therminol-59 ® by Monsanto. This material is an alkyl-substituted aromatic chemical that is totally miscible with the refrigerant and completely immiscible with water. This heat transfer oil is believed to improve the heat transfer characteristics within the emulsion that is subsequently formed, but it does not participate in the formation of the gas hydrate. It is also believed that the heat transfer oil reduces the temperature and pressure at which the gas hydrate forms. Other heat transfer oils, with similar properties which may be used include Therminol LT ®, Therminol-44 ®, Therminol-55 ®, Therminol-59 ®, Therminol-60 ®, Therminol-66 ®, Dowtherm J ®, Dowtherm SRI ®, Dowtherm 4000 ® and Dowfrost ®.

The refrigerant is injected into the vessel 10 as a liquefied gas under pressure. The preferred refrigerant is monochlorodifluoroethane, "R-142b," sold by the Pennwalt Corporation under its mark, Isotron-142b ®.

The physical and chemical properties of these three components are reported below:

TABLE 1

| Physical and Chemical Properties of the Liquid and Gaseous Components | |
|---|---|
| R-142b Refrigerant | |
| Specifications | |
| Isotron-142b ® wt %, minimum: | 99.85 |
| Moisture (H$_2$O), wt % maximum: | 0.0015 |
| Chlorides, wt %: | Nil |
| Residue, wt %, maximum: | 0.01 |
| Non-condensable gases, vol %, maximum: | 2.0 (vapor phase) |
| Properties | |
| Appearance: | Clear, colorless liquefied gas |
| Odor: | Faint, ethereal odor |
| Molecular Weight: | 100.5 |
| Boiling Point (1 atm): | 15.1° F. |
| Boiling Range (1 atm): | 0.5° F. |
| Freezing Point (1 atm): | −204° F. |
| Flammability Limits, vol % in air: | 6.9 to 15.5 |
| Vapor Pressure, psia: | 43.53 at 70° F. |
| Liquid Density, lb./cu. ft.: | 69.93 at 70° F. |
| Therminol-59 ° Heat Transfer Oil | |
| Properties | |
| Appearance: | Light yellow liquid |
| Odor | Faint, aromatic |

TABLE 1-continued
Physical and Chemical Properties of the Liquid and Gaseous Components

| | |
|---|---|
| Molecular Weight: | 229 |
| Boiling Point (1 atm): | 154° C. |
| Boiling Range (1 atm): | 550° F. 10%, 741° F. 90% |
| Freezing Point (1 atm): | −90° F. |
| Auto Ignition Temperature: | 835° F. |
| Vapor Pressure, mm Hg: | 30 at 350° F. |
| Liquid Density, lb./gal.: | 8.66 at −50° F. |
| | 8.35 at 50° F. |
| Specific Heat, BTU/lb.: | 0.420 at 0° F. |
| Thermal Conductivity, BTU/hr-ft-°F.: | 0.0768 at 50° F. |
| Kinematic Viscosity, cS: | 1100 at 0° F. |

$H_2O$
Properties

| | |
|---|---|
| Appearance | clear liquid |
| Odor: | none |
| Molecular Weight: | 18.0 |
| Boiling Point (1 atm): | 100° C. |
| Boiling Range (1 atm): | 0.5° C. |
| Freezing Point (1 atm): | 0° C. |
| Vapor Pressure, mm Hg: | 760 at 25° C. |
| Liquid Density, Kg/L: | 1.0 at 25° C. |
| Specific Heat, BTU/lb.: | 1.0 at 25° C. |
| Thermal Conductivity, BTU/hr-ft/°F. | 0.320 at 0° C. |
| Kinematic Viscosity, cP: | 1.794 at 0° C. |

The refrigerant R-142b has the molecular formula $CH_3CClF_2$, with a molecular weight of 100.5 g/mole. The normal boiling point is −9.8° C., and the liquid density is about 1.5 g/cc. The vapor density is about 0.0042 g/cc.

When the refrigerant R-142b is in gas hydrate form, the molecular formula is $CH_3CClF_2 \cdot 17.0\ H_2O$, having a molecular weight of 406.5 g/mole.

While R-142b is the preferred refrigerant, other refrigerants can also be used in the process of this invention. For example, a mixture of refrigerants R-11 ($CCl_3F$) and R-12 ($CCl_2F_2$) provides satisfactory performance. The same is true of a mixture of refrigerants R-12 and R-114 [$(CClF_2)_2$]. Gas hydrates can be formed from these refrigerant mixtures at atmospheric pressure within acceptable HVAC temperature limits. Thus, an acceptable gas hydrate can be formed from a mixture of R-11 with R-12 in a 90-10 weight percent composition. Other compositions produce similar gas hydrates but at different temperatures and pressures.

One of the refrigerants that can also be used is refrigerant R-12 ($CCl_2F_2$). A comparison of the refrigerant properties of two refrigerants, R-12 and R-142b, appears in Table 2 below.

TABLE 2
Comparison of Refrigerant Properties

| PROPERTY | R-12 | R-142b |
|---|---|---|
| Chemical Formula | $CCl_2F_2$ | $CH_3CCLF_2$ |
| Ozone Depletion Potential | 1.0 | <0.05 |
| Green House Effect | 1.0 | <0.2 |
| Toxicity | low | low |
| Available | restricted, beginning 1989 | yes |

Other refrigerants, known in the art, which are capable of forming gas hydrates are contemplated for use in the process of the invention and include, but are not limited to the following: $CCl_3F$, $CCl_2F_2$, $CClF_3$, $CBrF_3$, $CBrClF_2$, $CHBrF_2$, $CF_4$, $CHCl_2F$, $CHClF_2$, $CH_2ClF$, $CHF_3$, $CH_2Cl_2$, $CH_3Cl$, $CH_3F$, $CH_3Br$, $CH_4$, $C_2CCl_3F_3$, $(CClF_2)_2$, $(CCl_2F)_2$, $C_2ClF_5$, $CH_3CClF_2$, $C_2H_5F$, $CH_3CHF_2$, $C_2H_6$, $C_3H_8$, $CO_2$, $C_2H_2$, $C_3H_6$, iso-butane, n-butane, octafluorocyclobutane, 1,3-dichloro-1,1,2,2,3,3-hexafluoropentane, R-500 (an azeotrope of R-12 and R-152a), R-502 (an azeotrope of R-12 and R-115), R-503 (an azeotrope of R-23 and R-13), and $C_2H_2F_4$ (R-134a). Any other compounds capable of forming gas hydrates are also contemplated for use as refrigerants in the process of this invention and include, but are not limited to the following: $N_2O$, $CH_3SH$, $SF_6$, $BrCl$, $Cl_2$, $AsH_3$, $H_2S$, $H_2Se$, and cyclopropane. The aforementioned refrigerant and compounds may be formed into gas hydrates, in the process of the invention, in mole ratios of 1:17 to 8:17 of gas to water, with the exact ratio dependent on the hydrate formed. Mixtures of these gases may also be used to provide different temperatures and pressures than achievable from the individual gases.

It is preferred to add the components in the order mentioned above, with water being added first, then the heat transfer oil, and finally, the refrigerant. When the heat transfer oil is added to the water already present in the vessel, the lighter organic heat transfer oil rises to the top of the liquid, and the denser water remains on the bottom. There may be a region between the two phases that suggests partial miscibility, since globules of light colored oil tend to appear in the aqueous phase adjacent the interface between the water and the oil. Generally these globules will disappear when the refrigerant is added to the system.

The higher density refrigerant R-142b is absorbed by the heat transfer oil to form a new organic phase that sinks to the bottom of the vessel. Thus, the water is now the upper phase, with a distinct interface between the two phases in the vessel.

When the motor 34 is turned on to activate the turbine blades 38, the agitation forms an emulsion, providing a much larger interfacial area. Tiny droplets of refrigerant and oil can be observed, suspended in the aqueous phase. This emulsion is unstable but may be maintained by continuous operation of the turbine mixing blades 38.

The speed of the turbine mixing blades 38 is maintained at a sufficiently high level so that the emulsion, if broken, is reformed promptly. The high rate of speed of the turbine mixing blades 38 should be adequate to cause circulation of the emulsion over the tops of the internal heat exchange coils 24 and 30, respectively.

At this time the temperature is gradually lowered within the vessel 10 by circulating refrigerant through the coil 24 and operating the compressor 40, condenser 43, and the blower motor 54, to start a conventional refrigeration cycle that cools the liquid within the vessel 10. As the emulsion cools, gas hydrate forms.

Particularly with new weight or volume relationships of the three reactants in the vessel 10, some surprising phenomena may be observed. For example, the gas hydrate may form rather instantaneously in some cases, and the gas hydrate may freeze. Thus, it is wise until operating parameters are thoroughly explored, to lower the temperature in the vessel 10 gradually. This may be accomplished by operating the compressor intermittently, for example, at one minute intervals. By thus having only intermittent periods of cooling, the system may be allowed to approach equilibrium gradually.

The system temperature may be observed to rise slightly during those intervals during which the refrigeration system is shut off, during its intermittent operation. This may be caused by the release of the heat of formation of the gas hydrate. However, from what is visible within the vessel, the emulsion appears to "flash" into the gas hydrate phase.

In addition to apparent slight temperature increases during the intervals when the refrigeration system is not in operation to cool the contents of the vessel 10, slight pressure increases may be observed prior to the time the gas hydrate is formed uniformly throughout the vessel. It is theorized that the heat released during gas hydrate formation may vaporize some of the liquid refrigerant in the heat exchange coil 24.

As the gaseous unconfined refrigerant R-142b within the vessel 10 is absorbed into the gas hydrate structure, some of this refrigerant that has been converted to the liquid state may vaporize to maintain equilibrium. A vaporization of any of the previously liquefied, unconfined refrigerant R-142b within the vessel would tend to cause an increase within the pressure within the system, and would be evidenced by the bubbling of the gaseous refrigerant through the gas hydrate "slush." As the gas hydrate appears in the liquid phase within the vessel, it appears as a light, crystalline slush, having a gel-like consistency. After formation of the gas hydrate, a film of the heat transfer oil generally appears on the surface of the liquid within the vessel. This indicates that the heat transfer oil does not participate in the process of gas hydrate formation, and that all of the liquid refrigerant R-142b has been depleted and converted into the gas hydrate form.

Once equilibrium has been established within the reactor vessel 10, or even prior to equilibration, the sump 48 is charged with a coolant liquid that may be, for example, a mixture of water and ethylene glycol. The pump 52 is then operated to draw coolant liquid up through the line 50, and then pass it into the line 28 under pressure for circulation through the heat exchange coil 30 that is disposed within the reactor vessel 10. The coolant gives up thermal energy to the liquid phase in the reactor vessel 10 as it is itself chilled. The chilled coolant is then discharged from the heat exchange coil 30 passing through the line 32 into the heat exchange array 44.

The operation of the fan blade 62 by the motor 54 passes a stream of atmospheric or environmental air over the heat exchange array 44, during which passage it is cooled, which is the desired result of the practice of the process. The coolant itself becomes heated in the process of cooling the environmental air, and is returned through the line 46 to the sump 48. The sump 48 should be large enough so that the coolant liquid in it tends to reach a generally uniform equilibrium temperature, but refrigeration or other heat exchange may be used if necessary to maintain a uniform temperature of the coolant liquid in the sump 48.

While the preferred coolant is a solution of water and ethylene glycol, each representing 50% by weight of the solution, other liquid coolants can be used. Among suitable coolants are:

Ethylene Glycol 30 Wt. %–60 Wt. % in water; Propylene Glycol, 30 Wt. %–60 Wt. % in water; Dowtherm J ®, Dowtherm SRI ®, Dowtherm 4000 ®, and Dowfrost ®, in a 30 Wt. %–60 Wt % solution in water; or 100% of Therminol LT ®, Therminol-44 ®, Therminol-55 ®, Therminol-59 ®, Therminol-60 ®, Therminol-66 ®.

General

The process of the invention offers several advantages, particularly for merchant ship and fishing boat applications, about which more details will be supplied later.

The operating cycle is easily described by an analogy. The gas hydrate slush in the reactor vessel 10 can be regarded as either a heat-deficient gas hydrate storage facility, or as a storage area for cold gas hydrate slurry. The refrigerant loop that circulates cold refrigerant through the heat exchange coil 24, when operating, withdraws thermal energy from the gas hydrate slush in the reactor vessel and keeps it cold. Thus when the coolant pump 52 is operated to circulate a coolant liquid through the heat exchange coil 30, thermal energy is transferred from the coolant into the gas hydrate slush, and the chilled coolant is used to cool air that is blown through the heat exchange array 44. Thus there is a need within the reactor 10 for both a cooling heat exchanger and what is, in effect, a heating heat exchanger, to maintain the thermal equilibrium of the gas hydrate slush.

The operation of the system depends upon the warmed gas hydrate undergoing a phase change and taking up thermal energy from the liquid contents of the reactor vessel 10. Then, as the refrigerating part of the equipment is operated, the gas hydrate slush in the reactor vessel is chilled and the gas hydrate reforms, to continue going through the cycle again and again.

Gas hydrates decompose readily when they reach the phase transition temperature and pressure. However, the formation of hydrates in a sealed system can require a considerable degree of subcooling to encourage nucleation or crystal formation. Once nucleation has occurred, formation of the remaining hydrate occurs very smoothly. For example, if a hydrate is formed with $CCl_2F_2$, more commonly known as Freon 12, in a sealed container, then at temperatures around 12.2° C. decomposition will occur. If all of the hydrate is not decomposed, then cooling to 11.1° C. will encourage the reformation of the hydrate, albeit relatively slowly. Cooling to 8.3° C. will encourage rapid reformation of the hydrate. However, if all of the hydrate is decomposed, i.e., there are no hydrate crystals remaining, then cooling to less than 2.2° C. with some shaking will usually be required to reform the hydrate. For many applications, it is not practical to always have some hydrate crystals in solution or to provide the 10° C. or more subcooling to promote reformation. This problem is overcome in this system by using continuous mixing throughout the formation interval.

During the operation of the system, care must be taken to maintain the thermal energy balance in the gas hydrate slush in the reactor vessel so that ice does not form instead of gas hydrate. Ice formation is to be avoided because ice acts as an insulator and may interfere with the proper operation of the process and equipment.

When equilibrium is maintained within the reactor vessel 10, gas hydrate will be formed at such a rate that the heat of formation of the gas hydrate is equivalent to the heat of vaporization of the liquid refrigerant, or more accurately, to the rate of heat removal by the refrigerant passing through the heat exchange coil 24.

Gas hydrate thermal energy storage systems, and particularly the system disclosed in this application, can be and are operated at overall average temperatures above the temperature at which ice forms. Thus, the difficulties encountered when ice appears in the system can be avoided.

The apparatus of this invention may be configured to provide means to allow transportability of the system. The apparatus may also include means to physically disengage (e.g., by quick disconnects) the internal heat exchanger subsystem (i.e., the compressor, condenser, and lines which are used in the charging cycle) so that the remaining system may be used solely as an air cooling source. It is also contemplated that the combination of these features may be provided wherein the apparatus may be charged in one location, and moved to another location for discharge.

It is contemplated that the best mode of this invention embodies the use of engineering plastics known by persons skilled in the art to be suitable for the manufacture and use of the components of the apparatus of the invention and the practice of the process of the invention.

The invention will now be illustrated by reference to some specific demonstrations of the process and specific descriptions of the equipment. Throughout, all parts and percentages are by weight, and all temperatures are in degrees Celsius, unless expressly stated to be otherwise.

EXAMPLE

Equipment

The equipment used in this Example was a modification of an existing 8100 BTU air conditioning unit. The modification involved a rearrangement of the components of the air conditioner and the addition of a reactor vessel as follows.

A refrigerant loop was formed using the compressor 40, the condenser 43, and blower fan blades 60 of the air conditioner, which was connected to an internal heat exchanger coil 24 within the reactor vessel 10. This refrigerant loop carried a refrigerant, R-142b (1,1,1-chlorodifluoroethane), which was used in the charging (gas hydrate formation) stage of the process.

An air conditioning unit/heat exchange array 44 was made from the evaporator and other blower fan blades 62 of the air conditioner, and was connected to a coolant coil 30 within the reactor vessel 10. This coil 30 carried a coolant, 50-50 wt. % ethylene glycol and water, which was used in the discharge (gas hydrate decomposition) stage of the process.

The reactor vessel 10 can be, and was, placed between the condenser 43 and heat exchange array 44. The reactor vessel consisted of a cylindrical column, 10.2 cm ID and 38.75 cm in height, fabricated of R4000, 4-inch, virgin-grade polyvinyl chloride (PVC) without fillers, and designed to withstand pressures up to 100 psia. The reactor vessel was mounted between two machined aluminum heads, sealed with Teflon ® gaskets, and held by six threaded rods.

The reactor vessel 10 contained two internal concentric counterflow heat exchanger coils fabricated of $\frac{3}{8}$-inch OD and $\frac{1}{4}$-inch OD copper tubing. The outer $\frac{3}{8}$-inch coil 24 was part of the internal heat exchanger, used in the charging stage, which accepted high-pressure liquid refrigerant from a $\frac{1}{4}$-inch OD copper tube 22 from the condenser 43 which expanded it in the coil (the transition serving as an expansion valve) and absorbed heat from the reactor. The inner $\frac{1}{4}$-inch coil 30 was part of the air conditioning unit, used in the discharge stage, which pumped coolant from a "Haake A82" circulating bath (maintained at 15.0° C.) through the reactor to the heat exchange array 44, and returned to the sump 48. Thermal energy ("cold") was extracted from the reactor vessel and transferred (via the coolant) to the heat exchange array 44, where ambient air was drawn across it, cooled and discharged back into a room. The two blower fan blades 60 and 62 were driven by a ½ hp motor. A "Parr Mini Reactor" mixer, with a variable speed control, was mounted above the head assembly of the reactor to mix and emulsify the reaction components.

Process

A storage material comprising 1230 milliliters of laboratory distilled water, at approximately 20° C. and 1 atm., and 360 milliliters (403.2 g) of liquefied refrigerant R-142b (1,1,1-chlorodifluoroethane), was charged into a 2.5 liter reactor vessel, having the geometry shown in FIG. 2. Also charged, to be a part of the thermal storage medium, was 400 ml of a heat transfer oil, Therminol-59 ®, sold by Monsanto Company.

This thermal storage medium forms a Type II gas hydrate having a phase change temperature of 8.9° C. and a latent heat of fusion of 122 BTU/lb. In this Example, the mole fraction of refrigerant to Therminol-59 ® for this gas hydrate was 0.7 to 0.3 and the specified amount of water used was in a slight excess of the stoichiometric proportion of 17:1 water to R-142b as required for gas hydrate formation.

The charging cycle was initiated by adding the water and Therminol-59 ® to the reactor. The reactor was then held to a vacuum for 30 minutes to remove noncondensable and dissolved gases. Liquid refrigerant was then added from a pressurized cylinder while a coolant was circulated through the coolant coil. A pressure driving force was established by circulating the coolant through the reactor where the lower temperature lowered the R-142b vapor pressure and liquid refrigerant was forced from the cylinder into the reactor. When the desired level was reached, the appropriate valves were closed and the coolant circulation was stopped. The reactor was allowed to equilibrate and reach ambient temperature.

The mixer was then started and operated at a speed of 500 RPM to ensure that circulation covered the tops of the internal concentric heat exchanger coils. Continuous mixing allowed the water, R-142b, and oil to form an emulsion, maintained the emulsion throughout the run, and reduced temperature gradients in the reactor. The compressor and blower fan blades of the refrigerant loop were started concurrent to the mixer, and were run intermittently for one minute cycles at one minute intervals. The refrigerant loop was energized intermittently to avoid the problem of subcooling the emulsion so quickly that ice was formed rather than gas hydrate.

Gas hydrate was formed from the emulsion when the temperature within the reactor was reduced sufficiently, which was usually within 15 minutes. The charging stage was continued for an additional 15 minutes to allow complete reaction and subcooling of the gas hydrate.

The gas hydrate appeared as a light crystalline slush, having a gel-like consistency. After formation of the gas hydrate, a thin film of Therminol-59 ® appeared on the surface, signalling that all of the R-142b refrigerant had been converted to gas hydrate and evidencing that the heat transfer oil was not part of the hydrate formation.

After 30 total minutes of charging, the compressor, blower fan blades and mixer were turned off.

The gas hydrate decomposition ("discharge") stage was initiated by starting the external heat exchanger/air conditioning unit and the mixer. The mixer was again run at a speed of 500 RPM, resulting in significant sensible heat difference in the coolant, relatively constant temperature increase across the reactor vessel, and emulsification of the water, R-142b, and Therminol-59 ® as the gas hydrate decomposed. The coolant, an ethylene glycol in water solution, entered the reactor at approximately 15° C. and exited the reactor at 9° C.–13° C., passing to the air conditioning unit. In the air conditioning unit, ambient air was pulled across the heat exchange array by a squirrel-cage fan, cooled and returned to a room. The ethylene glycol solution left the heat exchange array at 15°–17° C. and was returned to the sump. The discharge stage was run for 60 minutes, providing cooling air, but could theoretically have been maintained in excess of 180 minutes, in the particular equipment used.

Based on these results, and further testing, a proportionally scaled-up system would be effective in providing a longer decomposition time, given proportionally increased component materials and charging time. Other proportions of reactants which may be used in this invention are shown in Table 3, based on the specified mole fraction of R-142b in Therminol-59 ®.

TABLE 3

| MOL FRACTION R142B | MOL FRACTION T-59 | WATER (mls/L) | R142b (gms/L) | T-59 (mls/L) |
| --- | --- | --- | --- | --- |
| 0.9999 | 0.0001 | 770.16 | 252.2 | 0.061 |
| 0.95 | 0.05 | 747.17 | 245.2 | 29.94 |
| 0.9 | 0.10 | 723.11 | 237.49 | 61.16 |
| 0.85 | 0.15 | 698.00 | 229.08 | 93.77 |
| 0.8 | 0.2 | 671.72 | 220.33 | 127.88 |
| 0.75 | 0.25 | 644.22 | 211.23 | 163.55 |
| 0.7 | 0.3 | 615.50 | 201.76 | 200.88 |
| 0.65 | 0.35 | 585.33 | 199.96 | 240.00 |
| 0.6 | 0.4 | 553.72 | 181.45 | 280.88 |
| 0.55 | 0.45 | 520.50 | 170.59 | 324.22 |
| 0.5 | 0.5 | 485.50 | 159.38 | 369.67 |
| 0.45 | 0.55 | 448.67 | 147.12 | 417.5 |
| 0.4 | 0.6 | 409.77 | 134.51 | 468.00 |
| 0.35 | 0.65 | 368.67 | 120.85 | 521.33 |

Advantages

The system of the invention has environmental advantages over conventional systems. It can be operated at temperatures above those required for other similar systems and during off-peak hours for reduced daytime electrical demand. Hence, on land, it may be more cost effective to operate than other systems.

The presence in the system of the heat transfer oil provides some improvement in the heat transfer properties of the system and also lowers the temperature and pressure at which the gas hydrate is formed. The addition of a non-participating organic liquid may be useful where those cooling applications where lower gas hydrate formation temperatures and pressures are desirable.

Continuous mixing of the contents of the reactor vessel improves the heat transfer from the gas hydrate to the water/ethylene glycol coolant mixture. The heat exchanger coil 30, when operating, releases thermal energy from the warm coolant mixture to the liquid phase within the reactor vessel thereby warming the gas hydrate slush while at the same time cooling the glycol mixture.

The coolant system need not include a sump; it may be a closed system. A sump was used in the work described above for experimental reasons.

While the invention has been described in terms of specific embodiments thereof, the description is intended in an illustrative rather than in a limiting sense.

What is claimed is:

1. A device for cooling a desired space comprising an enclosed vessel, gas hydrate thermal storage means disposed in said vessel, means comprising indirect heat exchange means disposed within said vessel for extracting thermal energy from said thermal storage means to cool it, and further comprising a loop connecting said heat exchange means with a compressor, condenser, and expansion valve, for cooling and circulating a refrigerant gas through said heat exchange means and said loop, separate means comprising indirect heat exchange means also disposed in said vessel for releasing thermal energy into said thermal storage means, and further comprising (1) a loop connecting said last-named indirect heat exchange means with (2) a means for circulating coolant through said loop and (3) means located in said desired space for withdrawing thermal energy from said desired space thereby to cool it, means disposed within said vessel for agitating said gas hydrate thermal storage means in said vessel, and wherein said gas hydrate thermal storage means comprises water, a refrigerant gas, and a heat transfer oil.

2. A device of claim 1 wherein said two indirect heat exchange means comprise a pair of heat exchange coils respectively, one disposed within the other, said coils being in close proximity to each other.

3. A device of claim 1 wherein said means for agitating said gas hydrate thermal storage means in said vessel comprises means capable of emulsifying said gas hydrate thermal energy storage means.

4. A device of claim 1 wherein said refrigerant gas comprises a gas identified by a chemical formula selected from the group consisting of: $CCl_3F$, $CCl_2F_2$, $CHCl_2F$, $CHClF_2$, $CHF_3$, $CH_2Cl_2$, $(CCl_2F)_2$, $(CClF_2)_2$, $C_2ClF_5$, $CH_3CClF_2$, $C_2H_2F_4$, and mixtures thereof.

5. A device of claim 1 wherein said refrigerant gas has the chemical formula $CH_3CClF_2$.

6. Gas hydrate thermal storage means comprising an enclosed vessel, and gas hydrate thermal storage means disposed within said vessel and comprising water, a refrigerant gas, and heat transfer oil.

7. Gas hydrate thermal storage means of claim 6, wherein said water, refrigerant gas, and heat transfer oil, when in intimate contact, are convertible, at temperatures in the range from about 5° C. to about 13° C., to a gas hydrate slush.

8. Thermal storage means of claim 7 wherein said refrigerant gas is selected from the group consisting of: $CCl_3F$, $CCl_2F_2$, $CHCl_2F$, $CHClF_2$, $CHF_3$, $CH_2Cl_2$, $(CCl_2F)_2$, $(CClF_2)_2$, $C_2ClF_5$, $CH_3CClF_2$, $C_2H_2F_4$, and mixtures thereof.

9. Thermal storage means of claim 7 wherein said refrigerant gas comprises $CH_3CClF_2$.

10. A process for withdrawing thermal energy from a desired space, comprising
　establishing within a closed vessel a mass of gas hydrate slush as a thermal energy storage means,
　circulating coolant so as to release thermal energy into said thermal energy storage means, and so as to extract thermal energy from said desired space and thereby cool it,
　circulating a refrigerant through said thermal energy storage means so as to withdraw thermal energy from said means and so as to release thermal energy externally of said vessel and of said desired space, agitating said thermal energy storage means to emulsify it, and wherein
　said thermal energy storage means comprises water, a refrigerant gas and a heat transfer oil.

11. A process of claim 10 wherein said refrigerant gas has a chemical formula selected from the group consisting of: $CCl_3F$, $CCl_2F_2$, $CHCl_2F$, $CHClF_2$, $CHF_3$, $CH_2Cl_2$, $(CCl_2F)_2$, $(CClF_2)_2$, $C_2ClF_5$, $CH_3CClF_2$, $C_2H_2F_4$, and mixtures thereof.

12. A process of claim 10 wherein said refrigerant gas has the formula $CH_3CClF_2$.

* * * * *